United States Patent [19]

Gonzalez-Justiz

[11] Patent Number: 4,833,307

[45] Date of Patent: May 23, 1989

[54] SELF SERVICE DISPENSING ASSEMBLY FOR LOTTERY TICKETS

[76] Inventor: Clara E. Gonzalez-Justiz, 1555 W. 44th Pl., #329, Hialeah, Fla. 33012

[21] Appl. No.: 217,388

[22] Filed: Jul. 11, 1988

Related U.S. Application Data

[63] Continuation-in-part of Ser. No. 29,160, Jun. 6, 1987, abandoned.

[51] Int. Cl.[4] .............................................. G06K 15/20

[52] U.S. Cl. .................................... 235/375; 235/378; 235/383; 235/384; 235/381; 902/22

[58] Field of Search ............... 235/375, 378, 384, 381; 902/22

[56] References Cited

U.S. PATENT DOCUMENTS 4,720,785 1/1988 Shapiro ................................ 902/22

*Primary Examiner*—Harold I. Pitts

*Attorney, Agent, or Firm*—John Cyril Malloy

[57] ABSTRACT

An assembly for the self-serving purchase and dispensing specifically of lottery tickets wherein potential purchasers may approach and utilize the machine at an indoor or outdoor location such as at a drive-up window and further wherein the assembly does not have to be attended by a cashier or like personnel but may be operated by the purchaser to the extent of accepting the money for purchase, allowing a pre-selected lottery number to be imprinted on the purchase ticket and attend to the dispensing, subsequent to imprinting of the subject lottery number thereon, to the possession of the purchaser.

16 Claims, 1 Drawing Sheet

SELF SERVICE DISPENSING ASSEMBLY FOR LOTTERY TICKETS

This is a continuation-in-part application of co-pending U.S. patent application Ser. No. 029,160 filed June 6, 1987, now abandoned.

BACKGROUND OF THE INVENTION

1. Field of the Invention

This invention relates to a combined purchasing and dispensing assembly specifically but not necessarily exclusively for lottery tickets wherein the assembly is capable of being operated by a purchaser without the need for any type of cashier or clerical personnel.

2. Description of the Prior Art

Many states have adopted and legalized the concept of lottery for the purpose of raising additional revenues for worth while purposes including education, road works, government funding, etc. Typically, the lottery system is operated in any given state by the selling of lottery tickets. Frequently, the purchaser of a lottery ticket has the ability to choose a plurality of digits represented a pre-selected or chosen lottery number. The chosen number is printed on the lottery ticket sold as proof and/or receipt that purchase was made and that if the selected lottery number is chosen by the operators of the lottery that the holder of the ticket with the chosen lottery number thereon will in fact be paid the designated prize monies.

Experience dictates that there is a large demand for such lottery tickets at most of the vendor locations where such tickets are sold. The actual dispensing or selling of the tickets however, frequently takes extended periods of time by cashiers or like clerical personnel thereby adding expense to the vendors cost of operation.

Also, there is recognized move towards the selling, disbursing, etc. of a variety of items including but not limited to fast food items from facilities which specifically cater to motorists without the purchaser leaving their vehicle. Such "drive-up" facilities, as set forth above, are most commonly associated with fast food restaurants. It has previously been thought that such a drive-up approach was not readily adaptable to the selling of lottery tickets. However, it is clearly understandable that the purchasing and dispensing of lottery tickets to purchasers in vehicles would facilitate the distribution of such lottery tickets in a quick and efficient manner especially is clerical personnel or cashiers were not required for such dispensing. This would have advantageous features from the purpose of personal safety such that the occupants of a vehicle could clearly avoid vandalism or assault.

The U.S. Pat. No. to Shapiro 4,720,785 discloses a computer assisted ticketing device such as for garages which provides the necessary functions to allow check-in and check-out the computing of prices and the printing of tickets which are dispensed to the public. The input to this system is produced by the reading of ticket information from specifically designed tickets imprinted with bar code data. Additional information is entered into the system by reading bar code data representing, for example, the make of the car, identification of the license tag, etc. Absent from the Shapiro structure is the ability to purchase and/or pre-select a ticket having a "lottery number" thereon which may be pre-selected by the purchaser at the time of purchase.

SUMMARY OF THE INVENTION

The present invention relates to an assembly designed to dispense lottery tickets to purchasers thereof without the need for help or distribution by cashiers, clerical personnel or the like and further wherein the assembly is mounted in a housing capable of being located at any convenient location to provide free and clear access to a purchaser. Along these lines, the purchaser may have access to the given dispensing and purchasing assembly at a location similar to an automatic teller machine wherein patrons walk-up to the machine and perform the desired services only with the aid of the machine. Alternately, the assembly may be located for use in the same manner as a drive-up window type of location in communicating access to a driveway such that a plurality of cars can line-up and individually operate the various components of the assembly to purchase one or more tickets in the prescribed manner.

The assembly includes a control means for the activation, regulation and operation of many of the additional components comprising the assembly such that one or more lottery ticket may be purchased through the input of money of a predetermined denomination and total into the housing through an input means. In addition, the control means may be electrically or otherwise applicably connected to various other components to attend to the printing of any pre-selected lottery number directly on the ticket being purchased and the dispensing of the ticket once properly printed and paid for, to the purchaser.

In order to accomplish the above, the housing in which the plurality of components of the assembly are mounted includes an input means for receiving money, preferably paper money, such as dollar bills therein. A reader or identification means is associated in communicating relation with the input means such that the money being received is properly identified as being authentic, of the proper denomination and/or the required total for the purchase of one or more tickets. Once the money has been accepted as being authentic and correct in type and total, a dispenser is provided to remove the lottery tickets, individually passed through proper conveying means, well known in the art, such next available ticket to a printer. The printer, receives activating signals from the control means, by means of substantially conventional electronic circuitry indicative of the pre-chosen number.

More specifically, a keyboard may be mounted on an exposed face of the housing so as to be easily accessible to a purchaser. The purchaser merely presses the keys representative of the chosen number and once accepted and recognized as accurate such "data input" is conveyed to the control means and the proper components of the electronic control circuitry thereof. An activating switch assembly such as an entry button/switch and a cancell/switch is provided. When a given number is chosen, a display means clearly represents the chosen and "input number" by displaying the digits also on an exposed surface of the housing in a manner which is clearly recognizable to the purchaser. The display means may take any form such as a conventional LED or LCD, etc. Once the purchaser is satisfied that the correct number has been input, the entry button/switch is pressed sending proper activation signals to the printer causing the imprinting of the selected lottery number thereon. Once this is accomplished, the conventional conveying means associated with the subject assembly next passes the recently imprinted ticket directly through the outlet back to the purchaser to be maintained in his possession. Prior to dispensing of the ticket imprinted with the proper lottery number, the printer may also have associated therewith a timer, clock and/or date mechanism associated therewith such that the proper date of purchase and/or dispensing may "automatically" be imprinted on the ticket concurrently to printing the chosen lottery number thereon. Such lock/date mechanism is well-known in the art and may be incorporated as part of the printer assembly.

Another feature of the present invention includes a data transmission means associated with the control means and/or the electronic control circuitry associated therewith. This transmission means serves to transfer, through conventional telephone lines, modem, etc. the chosen lottery number and any recognized registry or serial number of the ticket to a central computer facility located remote from the individual purchasing station where the aforementioned lottery ticket was just purchased and dispensed. The central computer facility has sufficient memory facility located thereat to store a very large number of lottery numbers as well as any other desired information such as local or identification of the station at which it was purchased and any other proper and useful information required. Naturally, the central computer facility and the associated computer memory is attended thereto will be in direct communication with numerous other remote control dispensing and purchasing stations similar to the one described herein.

Other features of the subject invention may include proper visual indicators such as light to indicate to a potential purchaser the current operational mode of the subject dispensing assembly.

The invention accordingly comprises the features of construction, a combination of elements, an arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
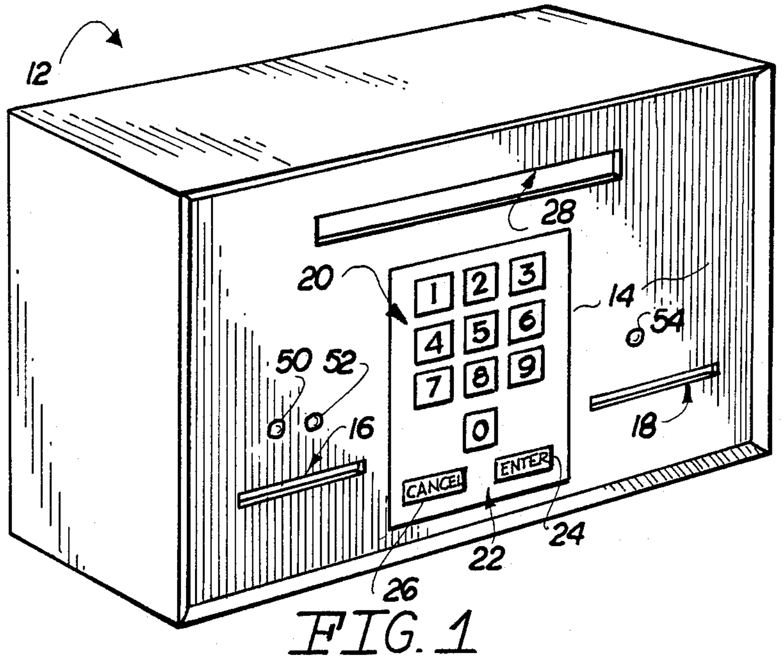
FIG. 1 is a perspective view of a housing showing various components of the subject dispensing and purchasing assembly readily accessible on an exposed face thereof.
Figure 2:
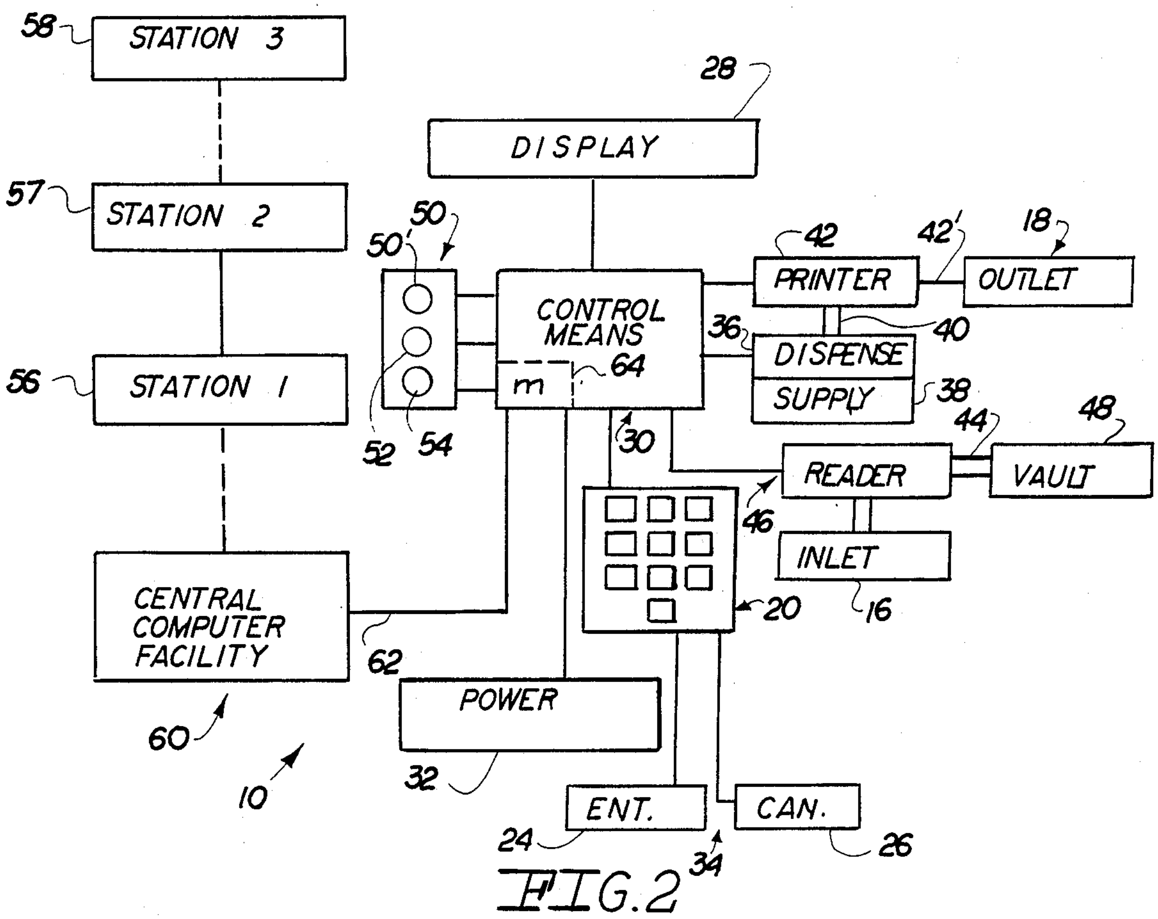
FIG. 2 is a schematic representation showing numerous ones of the components of the system as well as the purchasing and dispensing assembly of the present invention associated therewith.

As shown in FIGS. 1 and 2, the present invention is directed towards an assembly represented schematically in FIG. 2 and generally indicated as 10 and house, at least for the most part, within a protective housing generally indicated as 12 (see FIG. 2). The housing may be of any preferred and adaptable configuration having at least one exposed face 14 positionable in ready and easy access to potential purchasers wanting to purchase one or more lottery tickets. The exposed face 14 has an entry slot generally indicated as 16 defining part of an inlet means and an exit slot or aperture generally indicated as 18 defining a portion of the outlet means to be described in greater detail hereinafter. Further, the exposed face or surface 14 has mounted thereon a keyboard generally indicated as 20 comprising a plurality of buttons/switches representing the digits 0 through 9 clearly indicated in FIG. 1. In addition, a supplementary switch assembly is generally indicated as 22 and is more specifically defined by an entry button/switch 24 and a cancel button/switch 26 which will be explained in greater detail hereinafter. Finally, a window or exposed surface as at 28 is provided for a visual display for purposes of identifying and verifying the chosen or pre-selected lottery number to be imprinted on the ticket being purchased. The visual display may of course take any one of a variety of conventional structures including a light emitting diode assembly (LED) or liquid crystal display (LCD) or any other applicable means of displaying to the purchaser the various digits representing the lottery number to be imprinted on the ticket being purchased.

With regard to FIG. 2, the assembly of the present invention includes a control means generally indicated as 30 and being schematically represented only. The control means may include a variety of adequate electronic control circuitries serving to electrically interconnect the various components, to be described in greater detail hereinafter, so as to provide activating signals to the components thereby serving to regulate their operation independently and relative to one another. The control means may further be directly interconnected to a conventional alternating current power supply as at 32 or alternately the power supply 32 may be any type of self-contained power supply, rechargable, wet cell or dry cell battery of sufficient capacity to handle the operations of the various components of the assembly as described herein.

The keyboard generally indicated as 20 is structured to define a data input means which, set forth above with regard to the explanation of FIG. 1 is readily accessible to the purchasing public such that one desiring to purchase a lottery ticket merely approaches the exposed face 14, inserts the predetermined denomination and quantity of money through inlet 16 and, after authentication, identification and acceptance of the money may, through operation of the keyboard 20 defining the data input means, press the appropriate buttons each representative of one of a plurality of digits 0 through 9 as clearly shown in FIG. 1. Upon the input, on a digit by digit basis, of the pre-selected lottery number, such selected digits will be visually observable by the display means 28. Once the purchaser is satisfied that the entire selected lottery number is accurate by viewing the display means 28, he activates complete operation of the assembly including printing and dispensing of the lottery ticket through the manipulation of a supplementary or auxiliary switching assembly 34 which may be generally associated with the keyboard 20 and be considered part of the data input means. Such auxiliary switch assembly includes an entry button/switch 24 and a cancel button/switch 26.

In operation, if a purchaser correctly enters the chosen lottery number and such number is correctly displayed by display means 28, the entry button/switch is pushed thereby sending activation signals from the data input means of the keyboard 20 to the control means where it is transferred, through electronic circuitry to the dispensing means 36.

The dispensing means is connected in communicating relation, by conventional and adequate conveying facilities to a ticket supply and/or storage facility 38. A single ticket is removed therefrom and transferred or conveyed through the aforementioned conveying system as at 40 to a printer means 42. The printer means, is activated, either from signals from the dispensing means 36 and/or adequate recognition switching or signaling facilities associated with the printer itself as at 42. In any event, the proper electronic circuitry associated with the control means 30 serves to activate the printer for the imparting thereon of the chosen lottery number still being displayed within the display means 28. In addition, the printer mean may be considered to include a date/time keeping mechanism which automatically serves to keep track of the data and/or time imprinting of a given number occurs. This date/time is concurrently printed on each lottery ticket dispense and thereby indicates the time of dispensing or purchase which of course is assumed to be the same. Such a date/time keeping mechanism is considered to be well-known in the prior art and accordingly is not independently designated in FIG. 2. Once the printing has been accomplished, the component of the conveying facility as at 42 serves to transfer the ticket from the printer through the outlet means 18 where it can be dispensed directly to the purchaser.

All of the above must take place only after the money input through the input means 16 is first recognized as being authentic tender, of proper denomination and of the total amount required. Such is accomplished by the reader means generally indicated as 46. The reader means may take a variety of well-known and conventional reader and/or identification assemblies commercially available. Such reader assembly will be preprogrammed to "view" and evaluate the authenticity and denomination of the money inserted through the inlet 16. Once so done, the money is passed-on, through proper conveying components as at 44 to a vault or like storage facility 48. The vault or storage facility 48 can be readily accessible by authorized personnel only since it is normally kept under lock to protect against theft or any unauthorized removal of the collected purchasing funds.

Other structural features associated with each of a plurality of such dispensing assemblies as at 10 include proper indicator means generally indicated as 50. The indicator means may include a first visual indicator such as a light 52 connected to the control means and by such connection connected to the ticket supply 38. The visual indicator or light 50 is readily exposed and accessible on the face 14 of the housing 12 and may indicate, when lit or when not lit, that an adequate supply of tickets is available and that the condition of the dispensing assembly is in an operative mode. A second light or appropriate visual indicator as at 52 may also be mounted on the exposed face 14 and be considered part of the indicator means 50. This visual indicator 52 may give adequate visual warning or indication that the money input into the input means 16 is either accepted or not accepted depending on the pre-program intentions and desires of the operability of the assembly 10. Yet a third visual indicator and/or light 54 may also be mounted on the exposed surface 14 and possibly associated with the outlet means 18. Such light or visual indicator may be activated immediately before and until the dispensed ticket now having the imprinted lottery number thereon is removed from the outlet means 18.

Yet another feature of the present invention and more specifically a system incorporating a plurality of the dispensing assemblies 10 may include a plurality of remotely located assemblies, designated as station 1, station 2, station 3, etc. and respectively indicated by records numerals 56, 57, 58. Each being electronically connected to a remotely disposable but centrally located computer facility generally indicated as 60. Such computer facilities may include significant memory storage facilities such that each lottery number purchased and any type of identification and registry number associated with the ticket on which it is imprinted may be stored at such central computer facility and within such memory facility such that it may be recalled at will. To accomplish this, proper transmission lines such as long-distance telephone lines, etc. may be utilized to interconnect the remote central computer facility 60 with a transmission means 64 being a part of the control means and possibly associated directly with the electronic control circuitry. Again the transmission means 64 may take the form of any type of conventional modem or any other applicable facility capable of transmitting the information, in the form of large quantities of individual lottery numbers from the individual stations and dispensing assemblies 56, 57, 58 directly to the central computer facilities 60.

Now that the invention has been described, what is claimed is:

1. A purchasing and dispensing assembly for lottery tickets designed for self operation to allow purchasers thereof the preselection of a lottery number and having such number printed on the purchased ticket, said assembly comprising:

a. a housing disposable in accessible relation to patrons which may approach the housing either in a vehicle or on foot, b. control means mounted within said housing and structured to include a control circuitry interconnecting a remainder of a plurality of components defining said assembly for regulation, activation and operation thereof, c. inlet means mounted on said housing and structured to receive money from a patron for payment of the lottery ticket being purchased, d. reader means connected to said control means and disposed within said housing in communicating relation to said inlet means and money entering the housing therethrough, e. printer means mounted within said housing in receiving and communicating relation to a contained supply of lottery tickets and connected to said control means and structured for printing of a selected lottery number thereon upon receiving activation and data input signals from said control means, f. data input means including a keyboard assembly interconnected to said printer means via said electrical control circuitry for the input of digital information including a selected lottery number, g. said printer means further structured to receive actuation signals via said control circuitry from said reader means upon identification thereof of input money of predetermined denomination or total, and h. outlet means in communicating relation to said printer means and ticket supply and structured for exiting a ticket from said housing after printing of the selected lottery number thereon.

2. An assembly as in claim 1 wherein said data input means further comprises a switching assembly mounted on said keyboard and connected to said control means, said switching assembly including a cancel switch and an entry switch respectively structured and interconnected to said control circuitry to cancel and instigate sending of activation/data signals to said printer assembly substantially to accomplish entry of said digital information representative of said selected lottery number.

3. An assembly as in claim 2 wherein said keyboard assembly comprises a plurality of key switches each representative of an input signal to said control mens defining the digits 0 through 9.

4. An assembly as in claim 1 further comprising a display means for displaying the selected lottery number and data input from said input means and being interconnected thereto via said control circuitry.

5. An assembly as in claim 4 wherein said display means is mounted at least in part on an exposed face of said housing and structured to visually display the input digital information defined by and including the lottery number.

6. An assembly as in claim 1 further comprising indicator means comprising a first indicator mounted on an exposed face of said housing and connected to said control means and structured to indicate an operative mode of said assembly.

7. An assembly as in claim 6 wherein said operative mode is at least partially defined by an adequate ticket supply within said housing and the acceptability of said input means of money for the purchase of the lottery ticket.

8. An assembly as in claim 6 wherein said indicator means further comprises a second indicator interconnected to said reader means via said control circuitry and structured to indicate acceptability of money paid through said input means.

9. An assembly as in claim 8 wherein the indicator means comprises a third indicator mounted on an exposed face of said housing and connected to said control means and structured to include a completed and accurate entry of said digital information.

10. An assembly as in claim 9 wherein said first, second and third indicators are visual indicators.

11. An assembly as in claim 1 further comprising a dispensing means mounted within said housing in connecting relation with at least said ticket supply, said printer means and said outlet means, for conveying a lottery ticket therebetween.

12. An assembly as in claim 11 wherein said dispensing means is further interconnected at least in part between said inlet means, said reader means and a money storage facility for conveying money input into the housing therebetween.

13. An assembly as in claim 12 wherein said money storage means comprises a vault structure.

14. An assembly as in claim 1 wherein said control means further comprises data transmission means defining a part thereof and structured to direct said input digital information defined by the lottery number to a central money storage facility.

15. A purchasing and dispensing assembly for lottery tickets designed for self operation to allow purchasers thereof the preselection of a lottery number and having such number printed on the purchased ticket, said assembly comprising:

a. a housing disposable in excessible relation to patrons which may approach the housing either in a vehicle or on foot, b. control means mounted within said housing and structured to include a control circuitry interconnecting a remainder of a plurality of components defining said assembly for regulation, activation and operation thereof, c. inlet means mounted on said housing and structured to receive money from a patron for payment of the lottery ticket being purchased, d. reader means connected to said control means and disposed within said housing in communicating relation to said inlet means and money entering the housing therethrough, e. printer means mounted within said housing in receiving and communicating relation to a contained supply of lottery tickets and connected to said control means and structured for printing of a selected lottery number thereon upon receiving activation and data input signals from said control means, f. data input means including a keyboard assembly interconnected to said printer means via said electrical control circuitry for the input of digital information including a selected lottery number, g. said printer means further structured to receive actuation signals via said control circuitry from said reader means upon identification thereof of input money of predetermined denomination or total, h. outlet means in communicating relation to said printer means and ticket supply and structured for exiting a ticket from said housing after printing of the selected lottery number thereon, and i. said control means further including a data transmission means structured to direct digital information input into said control means via said data input means to a central, remote location, said central and remote location comprising a central computer memory storage facility.

16. An assembly as in claim 15 wherein a plurality of different dispensing assemblies are each connected at a variety of remote locations to said remote central computer memory storage facility, whereby each of a plurality of preselected lottery numbers are maintained in said memory storage facility.

* * * * *